(12) United States Patent
Fitzgerald et al.

(10) Patent No.: US 8,924,917 B2
(45) Date of Patent: *Dec. 30, 2014

(54) METHODS AND APPARATUS FOR STORING AND TRANSMITTING HISTORICAL CONFIGURATION DATA ASSOCIATED WITH INFORMATION TECHNOLOGY ASSETS

(71) Applicant: ManageIQ, Inc., Mahwah, NJ (US)

(72) Inventors: Joseph Fitzgerald, Franklin Lakes, NJ (US); Oleg Barenboim, Fort Lee, NJ (US); Gregory McCullough, Kinnelon, NJ (US); Gregg Tanzillo, Middletown, NY (US); Richard Oliveri, Warren, NJ (US); Daniel A. Clarizio, Antelope, CA (US)

(73) Assignee: ManageIQ, Inc., Raleigh, NC (US)

( * ) Notice: Subject to any disclaimer, the term of this patent is extended or adjusted under 35 U.S.C. 154(b) by 100 days.

This patent is subject to a terminal disclaimer.

(21) Appl. No.: 13/847,908

(22) Filed: Mar. 20, 2013

(65) Prior Publication Data
US 2013/0232122 A1    Sep. 5, 2013

Related U.S. Application Data

(63) Continuation of application No. 11/945,947, filed on Nov. 27, 2007, now Pat. No. 8,407,688.

(51) Int. Cl.
 G06F 9/44 (2006.01)
 G06F 11/14 (2006.01)
 G06F 9/445 (2006.01)
(52) U.S. Cl.
 CPC ............. *G06F 11/1469* (2013.01); *G06F 8/60* (2013.01); *Y10S 707/99953* (2013.01); *Y10S 707/99954* (2013.01)
 USPC .... 717/101; 717/120; 717/121; 707/999.202; 707/999.203
(58) Field of Classification Search
 None
 See application file for complete search history.

(56) References Cited

U.S. PATENT DOCUMENTS 5,278,979 A   1/1994  Foster et al.
5,574,906 A   11/1996 Morris (Continued)

FOREIGN PATENT DOCUMENTS

CA      2547630        6/2005
EP      1674965        6/2006
WO   WO 2006036277    4/2005

OTHER PUBLICATIONS

Yemini, et al., "NESTOR: An Architecture for Network Self-Management and Organization"; 2000, IEEE; [retrieved on Aug. 21, 2014]; Retrieved from Internet <URL:http://ieeexplore.ieee.org/stamp/stamp.jsp?tp=&arnumber=842991>;pp. 758-766.*

(Continued)

*Primary Examiner* — Xi D Chen
(74) *Attorney, Agent, or Firm* — K&L Gates LLP

(57) ABSTRACT

Methods and apparatus for storing and transmitting historical configuration data associated with information technology assets are disclosed. The system reads and stores a first version of data with a timestamp. The system then performs a local update by reading a second version of data with a timestamp, replacing the first set of data and timestamp, and storing the changes between the first and second versions of data. The system also may receive update requests from a remote location for the latest version of data. The changes between versions of data are sent to the remote location, where the changes between versions of data are stored and are usable to create the requested latest version of data and/or prior versions of data.

12 Claims, 4 Drawing Sheets

(56) References Cited

U.S. PATENT DOCUMENTS

| | | | |
|---|---|---|---|
| 5,581,764 A | 12/1996 | Fitzgerald et al. | |
| 5,761,477 A | 6/1998 | Wahbe et al. | |
| 6,000,000 A | 12/1999 | Hawkins et al. | |
| 6,003,075 A | 12/1999 | Arendt et al. | |
| 6,080,207 A | 6/2000 | Kroening et al. | |
| 6,085,244 A | 7/2000 | Wookey | |
| 6,169,976 B1 | 1/2001 | Colosso | |
| 6,253,258 B1 | 6/2001 | Cohen | |
| 6,292,889 B1 | 9/2001 | Fitzgerald et al. | |
| 6,381,677 B1 | 4/2002 | Beardsley et al. | |
| 6,463,535 B1 | 10/2002 | Drews | |
| 6,591,418 B2 | 7/2003 | Bryan et al. | |
| 6,601,233 B1* | 7/2003 | Underwood | 717/101 |
| 6,633,878 B1* | 10/2003 | Underwood | 707/999.202 |
| 6,711,660 B1 | 3/2004 | Milne et al. | |
| 6,718,535 B1* | 4/2004 | Underwood | 717/101 |
| 6,757,871 B1 | 6/2004 | Sato et al. | |
| 6,766,334 B1* | 7/2004 | Kaler et al. | 707/999.203 |
| 6,772,330 B2 | 8/2004 | Merkin | |
| 6,795,966 B1 | 9/2004 | Lim et al. | |
| 6,850,252 B1 | 2/2005 | Hoffberg | |
| 6,922,831 B1 | 7/2005 | Kroening et al. | |
| 6,973,466 B2* | 12/2005 | Kaler et al. | 707/999.203 |
| 6,993,746 B2 | 1/2006 | Hue | |
| 7,024,549 B1 | 4/2006 | Luu et al. | |
| 7,080,051 B1 | 7/2006 | Crawford | |
| 7,089,300 B1 | 8/2006 | Birse et al. | |
| 7,100,195 B1 | 8/2006 | Underwood | |
| 7,203,944 B1 | 4/2007 | van Rietschote et al. | |
| 7,233,939 B1 | 6/2007 | Ziauddin | |
| 7,272,799 B2 | 9/2007 | Imada et al. | |
| 7,313,793 B2 | 12/2007 | Traut et al. | |
| 7,356,679 B1 | 4/2008 | Le et al. | |
| 7,437,764 B1 | 10/2008 | Sobel et al. | |
| 7,475,097 B2* | 1/2009 | Kaler et al. | 717/121 |
| 7,496,757 B2 | 2/2009 | Abbott et al. | |
| 7,506,265 B1 | 3/2009 | Traut et al. | |
| 7,555,551 B1 | 6/2009 | McCorkendale et al. | |
| 7,567,984 B1 | 7/2009 | Todd | |
| 7,577,722 B1 | 8/2009 | Khandekar et al. | |
| 7,577,828 B2 | 8/2009 | Sammer et al. | |
| 7,584,195 B2 | 9/2009 | Johnson et al. | |
| 7,594,185 B2 | 9/2009 | Anderson et al. | |
| 7,657,871 B2 | 2/2010 | Velupillai | |
| 7,698,545 B1 | 4/2010 | Campbell et al. | |
| 7,747,589 B2* | 6/2010 | Lomet | 707/999.203 |
| 7,802,084 B2 | 9/2010 | Fitzgerald et al. | |
| 7,802,247 B1 | 9/2010 | Weathersby et al. | |
| 7,827,528 B2 | 11/2010 | Sattler et al. | |
| 7,831,968 B1 | 11/2010 | Weathersby et al. | |
| 7,860,834 B2 | 12/2010 | Meller et al. | |
| 7,890,951 B2 | 2/2011 | Vinberg et al. | |
| 7,908,589 B2 | 3/2011 | Sattler et al. | |
| 7,912,800 B2 | 3/2011 | Sattler et al. | |
| 7,941,786 B2 | 5/2011 | Scott et al. | |
| 8,015,563 B2 | 9/2011 | Araujo, Jr. et al. | |
| 8,073,926 B2 | 12/2011 | Traut et al. | |
| 8,301,874 B1 | 10/2012 | Heidingsfeld et al. | |
| 2001/0044834 A1 | 11/2001 | Bradshaw et al. | |
| 2002/0073236 A1 | 6/2002 | Helgeson et al. | |
| 2002/0100017 A1 | 7/2002 | Grier et al. | |
| 2003/0009752 A1 | 1/2003 | Gupta | |
| 2003/0037181 A1 | 2/2003 | Freed | |
| 2003/0070087 A1 | 4/2003 | Gryaznov | |
| 2003/0177278 A1 | 9/2003 | DeNatale | |
| 2004/0031030 A1 | 2/2004 | Kidder et al. | |
| 2004/0073899 A1 | 4/2004 | Luk et al. | |
| 2004/0128664 A1 | 7/2004 | Johnson | |
| 2004/0128670 A1 | 7/2004 | Robinson et al. | |
| 2004/0172550 A1 | 9/2004 | Sai | |
| 2004/0193913 A1 | 9/2004 | Han et al. | |
| 2004/0204266 A1 | 10/2004 | Owens et al. | |
| 2004/0205101 A1 | 10/2004 | Radhakrishnan | |
| 2004/0210653 A1 | 10/2004 | Kanoor et al. | |
| 2004/0216089 A1* | 10/2004 | Kaler et al. | 717/120 |
| 2004/0268347 A1 | 12/2004 | Knauerhase et al. | |
| 2005/0033970 A1 | 2/2005 | Anson et al. | |
| 2005/0080801 A1 | 4/2005 | Kothandaraman et al. | |
| 2005/0125513 A1 | 6/2005 | Sin-Ling Lam et al. | |
| 2005/0246436 A1 | 11/2005 | Day et al. | |
| 2005/0262101 A1 | 11/2005 | Halpern et al. | |
| 2005/0283640 A1 | 12/2005 | Cheston et al. | |
| 2005/0289542 A1 | 12/2005 | Uhlig et al. | |
| 2006/0004667 A1 | 1/2006 | Neil | |
| 2006/0010440 A1 | 1/2006 | Anderson et al. | |
| 2006/0025985 A1 | 2/2006 | Vinberg et al. | |
| 2006/0026219 A1 | 2/2006 | Orenstein et al. | |
| 2006/0036570 A1 | 2/2006 | Schaefer et al. | |
| 2006/0059253 A1 | 3/2006 | Goodman et al. | |
| 2006/0074876 A1 | 4/2006 | Kakivaya et al. | |
| 2006/0075252 A1 | 4/2006 | Kallahalla et al. | |
| 2006/0075487 A1 | 4/2006 | Pfleging et al. | |
| 2006/0136720 A1 | 6/2006 | Armstrong et al. | |
| 2006/0136910 A1 | 6/2006 | Brickell et al. | |
| 2006/0136911 A1 | 6/2006 | Robinson et al. | |
| 2006/0155735 A1 | 7/2006 | Traut et al. | |
| 2006/0179476 A1 | 8/2006 | Challener et al. | |
| 2006/0184935 A1 | 8/2006 | Abels et al. | |
| 2006/0184937 A1 | 8/2006 | Abels et al. | |
| 2006/0206900 A1 | 9/2006 | Ooyama et al. | |
| 2006/0218536 A1 | 9/2006 | Kirilline et al. | |
| 2006/0218544 A1 | 9/2006 | Chakraborty et al. | |
| 2006/0225065 A1 | 10/2006 | Chandhok et al. | |
| 2006/0274060 A1 | 12/2006 | Ni et al. | |
| 2006/0294421 A1 | 12/2006 | Schneider | |
| 2007/0028238 A1 | 2/2007 | Bennett et al. | |
| 2007/0043860 A1 | 2/2007 | Pabari | |
| 2007/0050409 A1 | 3/2007 | Bugir | |
| 2007/0050842 A1 | 3/2007 | Smith et al. | |
| 2007/0083610 A1 | 4/2007 | Treder et al. | |
| 2007/0083655 A1 | 4/2007 | Pedersen | |
| 2007/0130232 A1 | 6/2007 | Therrien et al. | |
| 2007/0136807 A1 | 6/2007 | DeLiberato et al. | |
| 2007/0169121 A1 | 7/2007 | Hunt et al. | |
| 2007/0179987 A1 | 8/2007 | Lim | |
| 2007/0180450 A1 | 8/2007 | Croft et al. | |
| 2007/0180493 A1 | 8/2007 | Croft et al. | |
| 2007/0192329 A1 | 8/2007 | Croft et al. | |
| 2007/0198612 A1 | 8/2007 | Prahlad et al. | |
| 2007/0198656 A1 | 8/2007 | Mazzaferri et al. | |
| 2007/0204266 A1 | 8/2007 | Beaty et al. | |
| 2007/0208685 A1 | 9/2007 | Blumenau | |
| 2007/0214408 A1 | 9/2007 | Straub et al. | |
| 2007/0230504 A1 | 10/2007 | Smith et al. | |
| 2007/0234356 A1 | 10/2007 | Martins et al. | |
| 2007/0250833 A1 | 10/2007 | Araujo, Jr. et al. | |
| 2007/0288228 A1 | 12/2007 | Taillefer et al. | |
| 2008/0016187 A1 | 1/2008 | Neil et al. | |
| 2008/0126439 A1 | 5/2008 | Kaminsky | |
| 2008/0301770 A1 | 12/2008 | Kinder | |
| 2010/0070970 A1 | 3/2010 | Hu et al. | |

OTHER PUBLICATIONS

Hindle, "Software Process Recovery: Recovering Process From Artifacts"; 2010 IEEE: [retrieved on Aug. 21, 2014]; Retrieved from Internet <URL:http://ieeexplore.ieee.org/stamp/stamp.jsp?tp=&arnumber=5645491>;pp. 305-308.*

Hunt, et al., "Delta Algorithms: An Empirical Analysis"; 1998 ACM; [retrieved on Aug. 21, 2014]; Retrieved from Internet <URL:http:dl.acm.org/citation.cfm?id=279310>;pp. 192-214.*

Junqueira, et al., "A fine-grained and flexible version control for software artifacts"; 2008 ACM; [retrieved on Aug. 21, 2014]; Retrieved from Internet <URL:http://dl.acm.org/citation.cfm?id=14565536>;pp. 185-192.*

Steinholtz et al., "Automatic Identification of Software System Differences", IEEE Trans. on Software Engineering, Apr. 1987, pp. 493-497, vol. SE-13, No. 4 [retrieved from internet on Nov. 14, 2012] <URL:http://ieeexplore.ieee.org/stamp/stamp.jsp?tp=&arnumber=1702241>.

Sirer, E.G. et al., "Design and Implementation of a Distributed Virtual Machine for Networked Computers," SOSP-17, ACM, Dec. 1999, pp. 202-216.

(56) References Cited

OTHER PUBLICATIONS

Martinez, P. et al., "Using the Script MIB for Policy-Based Configuration Management," 16 pages, 2002.
"Microsoft Windows XP: Using Software Restriction Policies to Protect Against Unauthorized Software," Microsoft TechNet, Jan. 1, 2002, 28 pages.
Traugott, S. et al. "Why Order Matters: Turing Equivalence in Automated Systems Administration," USENIX Large Installation System Administration Conference, Nov. 3-8, 2002, pp. 1-35.
Williams, M.A., "Anti-Trojan and Trojan Detection with In-Kernel Digital Signature Testing of Executables," NetXSecure NZ Limited, pp. 1-12, Apr. 16, 2002.
Doser, J., "Using SecureUML to Secure Controllers," Albert-Ludwigs-Unversitat Freiburg. 28 pages, 2003.
Doser, J., "Generating Access Control Infrastructures from SecureUML Models," Albert-Ludwigs-Unversitat Freiburg, 24 pages, 2003.
Garfinkel, T. et al., "Terra: A Virtual Machine-Based Platform for Trusted Computing," SOSP '03, ACM, Oct. 19-22, 2003, pp. 193-206.
"MSN Reduces New Server Build and Deploy Time by 98 Percent," Microsoft Corporation, Sep. 2003, 6 pages.
Apvrille, A. et al., "DigSig: Run-Time Authentication of Binaries at Kernel Level," 2004 Lisa XVIII, Nov. 14-19, 2004, pp. 59-66.
Bakos, G., "Honeypots and the Enterprise: Intelligence-based Risk Management," Institute for Security Technology Studies, Dartmouth College, 98 pages, 2004.
"EFI Framework FAQs," American Megatrends, Inc., 2004, 4 pages.
Haldar, V. et al., "Semantic Remote Attestation—A Virtual Machine Directed Approach to Trusted Computing," Proceedings of the Third Virtual Machine Research and Technology Symposium, USENIX Association, San Jose, CA, May 6-7, 2004, 14 pages.
Kim.H. et al., "Autograph: Toward Automated, Distributed Worm Signature Detection," 16 pages, 2004.
Krsul, I. et al., "VMPLants: Providing and Managing Virtual Machine Execution Environments for Grid Computing," IEEE, 2004, pp. 1-12.
Sufatrio et al., "A Machine-Oriented Integrated Vulnerability Database for Automated Vulnerability Detection and Processing," 2004 Lisa XVIII, Nov. 14-19, 2004, pp. 47-58.
Verdon, D. et al. "Risk Analysis in Software Design," IEEE Security & Privacy, 2004, pp. 32-37.
Wang, Y-M, et al., "Detecting Stealth Software with Strider GhostBuster," Dec. 13, 2004, Technical Report MSR-TR-2005-25, Microsoft Corporation, 11 pages.
Wang, Y-M, et al. Gatekeeper: Monitoring Auto-Start Extensibility Points (ASEPs) for Spyware Management, 2004 Lisa XVIII, Nov. 14-19, 2004, pp. 33-46.
Whitaker, A. et al., "Using Time Travel to Diagnose Computer Problems," 6 pages, 2004.
Banerjee, S.et al., "Scalable Grid Service Discovery Based on UDDI," MGC '05, Nov. 28-Dec. 2, 2005, ACM, 6 pages.
"Cache-Based System Management Architecture with Virtual Appliances, Network Repository and Virtual Appliance Transceivers," Jun. 9, 2005, 23 pages.
Calder, B. et al., "The Entropia Virtual Machine for Desktop Grids," VEE'05, ACM, Jun. 11-12, 2005, pp. 1-11.
Casper, B., "Using Network Appliance Snapshot Technology with VMware®ESX Server," Network Appliance, Inc., 2005, 14 pages.
Chen, Y., "Service-Oriented Computing: Architecture, Programming, and Applications," The Ninth TASTED International Conference on Software Engineering and Applications, Nov. 14-16, 2005, 40 pages.
Garfinkel, T. et al., "When Virtual is Harder Than Real: Security Challenges in Virtual Machine Based Computing Environments," 6 pages, 2005.
Goldfein, J., "PAC095 Workstation 5 and Beyond: What's New," VMworld 2005, Virtualize Now, 2005, 30 pages.
"JPI Version 7i Desktop Management," Hitachi Asia Ltd., 2005 4 pages.

Keahey, K., "Working Spaces: Virtual Machines in the Grid," Globus World 2005, Feb. 10, 2005, 23 pages.
Kieffer, M., "Windows Virtualization Architecture," Microsoft Corporation, 2005, 23 pages.
"Managing Configurations and Compliance with Oracle Enterprise Manager 10g," An OracleWhite Paper, Oracle, Sep. 2005, 9 pages.
Naik, V.K. et al., "Configuring, Deploying, and Managing Virtual Grid Environments," pp. 1-5, 2005.
Newsome, J. et al., "Polygraph: Automatically Generating Signatures for Polymorphic Worms," 16 pages, 2005.
Newsome, J. et al., "Polygraph: Automatically Generating Signatures for Polymorphic Worms," May 2005, 46 pages.
Stewart, V., "Network Appliance & VMware ESX Server: Instantaneous Backup & Recovery with NetApp Snapshot Technology," Oct. 2005, 15 pages.
Triumf/HEPnet Lightpath Object Composition GUI, Canarie, 14 pages, 2005.
"VMware ACE, Product Datasheet," VMware, Inc., 2005, 2 pages.
VMworld2005 Virtualize Now, VMware Education Services Course, Las Vegas, Oct. 18-20, 2005, 10 pages.
Waldspurger, C., "PAC485 Managing Datacenter Resources Using the 108 VirtualCenter Distributed Resource Scheduler," VMWorld 2005, VMware, Inc., 2005, 36 pages
Zhao, X. et al., "SVGrid: A SecureVirtual Environment for Untrusted Grid Applications," pp. 1-8, 2005.
Bloehdorn, S. et al., "TagrFS—Tag Semantics for Hierarchical File Systems," In Proceedings of the 6th International Conference on Knowledge Management (I-KNOW 06), Graz, Austria, Sep. 2-6, 2006, 8 pages, [online] Retrieved from the Internet http//semfs.ontoware.org/pubs/2006-2009-iknow2006-tagfs.pdf.
"Configuration Management," Hewlett-Packard Development Company, L.P., 2006 [online] [Retrieved on Dec. 15, 2006] Retrieved from the Internet http://openview.hp.com/solutions/ascm/Index.html.
"Configuration Management Solutions for Desktops," Hewlett-Packard Development Company, L.P., 2006, [online] [Retrieved on Dec. 15, 2006] Retrieved from the Internet http://openview.hp.com/products/radia__mdsk/index.html.
"Configuration Management Solutions for Servers," Hewlett-Packard Development Company, LP., 2006, [online] [Retrieved on Dec. 15, 2006] Retrieved from the Internet http://openview.hp.com/products/radia__msvr/index.html>.
Dharanikota et al., "Manageable Dynamic Execution Environments on the Grid Using Virtual Machines", Parallel and Applied Mathematics Lecture Notes in Computer Science, Jan. 2006, pp. 643.
Keahey, K. et al., "Virtual Infrastructure in the Grid," Jan. 30, 2006, 19 pages.
Keahey, K. et al., "Virtual Workspaces Achieving Quality of Service and Quality of Life in the Grid," 12 pages, 2005.
King, S.T. et al., "SubVirt: Implementing Malware with Virtual Machines," 14 pages, 2006.
Laverick, M., "VMware ESX 2.1/5 Server Administration II, Documents Version 1.3" RTFM Education, 117 pages, 2006.
Lemos, R., "Your Own Personal Matrix," PC Magazine, Oct. 17, 2006, 1 page.
Lin, B. et al., Towards an Understanding of Decision Complexity in IT Configuration,: IBM Corporation, 2006, 16 pages.
MacFarland, A. "PlateSpin Builds Flexibility into a clone-Based Data Center Lifestyle," The Clipper Group Navigator, Feb. 8, 2006, pp. 1-4.
Mohan, P. et al., "Semantic File Retrieval in File Systems Using Virtual Directories," 4 pages, 2006, [online] Retrieved from the Internet http://www.hipc.org/hipc2006/posters/semfs.pdf.
Potnis, N., "Debugging OS's with Time Traveling Virtual Machines," University of Michigan, 26 pages, 2006.
Reinhardt, M., "Energy-Aware Scheduling of Virtual Machines in a Multiprocessor Environment," Universitat Karlsruhe, Jun. 13, 2006, 86 pages.
St. Arnaud, B., "Service Oriented Architectures for R&E Networks Google Mashing Everything," Canarie, Inc., 18 pages, 2006.
Schenk, S. et al., TagFS: Bringing Semantic Metadata to the Filesystem, Institute for Computer Science, University of Koblenz, 2 pages, [online] Retrieved from the Internet http://eswc2006org/poster.papers/FR31-Schenk.pdf.

(56) References Cited

OTHER PUBLICATIONS

Schenk, S. et al. "TagFS—TagSemantics for Hierarchical File Systems," 2006, University of Koblenz Landau Germany, 31 pages, [online] Retrieved from the Internet http://i-know.know-center.tugraz.at/content/download/734/2960/file/vol kel.pdf.

"Unicenter CA—Teleview Session Management, Enterprise Systems Management," ca, 2006, [online] [Retrieved on Dec. 15, 2006] Retrieved from the Internet http://www3.ca.com/solutions/Product.aspx?ID=1525.

"VMTN—Virtual Appliances: How to Build a Virtual Appliance,": VMware, Inc., 2006, 9 pages.

Dig et al., "Refactoring-aware Configuration Management for Object-Oriented Programs", $29^{th}$ Intl. Conference on Software Engineering, IEEE, 2007, pp. 1-10 [retrieved from internet on Nov. 14, 2012] <URL:http://dl.acm.org/citation.cfm?id=1248820>.

Ganguly et al., "Reducing Comlexity of Software Deployment with Delta Configuration", IEEE, 2007, pp. 729-732 [retrieved from internet on Aug. 3, 2011] <URL:http://ieeexplore.ieee.org/xpls/abs_all.jsp?anumber=4258590.

Lu, W. et al., "Making Your Workspace Secure: Establishing Trust with VMs in the Grid," 10 pages, 2007.

International Search Report and Written Opinion of the International Searching Authority for International Application No. PCT/US08/84834, dated Jan. 13, 2009.

International Search Report and Written Opinion of the International Searching Authority for International Application No. PCT/U508/84844 dated Jan. 16, 2009.

International Search Report and Written Opinion of the International Searching Authority for International Application No. PCT/US08/84829, dated Jan. 22, 2009.

International Search Report and Written Opinion of the International Searching Authority for International Application No. PCT/U508/84860 dated Jan. 23, 2009.

International Search Report and Written Opinion of the International Searching Authority for International Application No. PCT/Uso 8/8 4853, dated Jan. 28, 2009.

Written Opinion of the International Searching Authority for International Application No. PCT/US07/81652 dated Apr. 23, 2008.

Written Opinion of the International Searching Authority for International Application No. PCT/U507/81646 dated May 5, 2008.

Written Opinion of the International Searching Authority for International Application No. PCT/US07/81636 dated Jun. 3, 2008.

Written Opinion of the International Searching Authority for International Application No. PCT/US07/81647 dated Jun. 3, 2008.

Written Opinion of the International Searching Authority for International Application No. PCT/US07/81644 dated Jun. 17, 2008.

Written Opinion of the International Searching Authority for International Application No. PCT/US08/84849 dated Jan. 12, 2009.

Written Opinion of the International Searching Authority for International Application No. PCT/U508/84823 dated Jan. 22, 2009.

Wang et al., "Rethink the Virtual Machine Template", VEE' 11, Mar. 9-11, 2011, pp. 39-69 <URL:http://dl.acm.org/citation.cfm?id=1952682>.

Halle et al., "ValidMaker: A Tool for Managing Device Configurations Using Logical Constraints", IEEE, 2012, pp. 1111-1118 [retrieved from internet on 22-14-12] <URL:http://ieeexplore.ieee.org/stamp/stamp.jsp?tp=&amumber=6212037>.

European Search Report issued Dec. 18, 2012 for corresponding European Appln. No. 12171750.8.

* cited by examiner

Before Update (Denotes Passage of time)

| TIME | CLIENT | SERVER |
|---|---|---|
| 1 | T1 (Full) = John Doe, Service Pack 1 | T1 (Full) = John Doe, Service Pack 1 |
| 2 | T2 (Full) = John Doe, Stan Lee<br>　　　　　Service Pack 2<br>T1 (Diff) = -Stan Lee,<br>　　　　-Service Pack 2, +Service Pack1 | T2 (Full) = John Doe, Stan Lee<br>　　　　　Service Pack 2<br>T1 (Diff) = -Stan Lee<br>　　　　-Service Pack 2, +Service Pack1 |
| 3 | T3 (Full) = Stan Lee, Service Pack 2<br>T2 (Diff) = +John Doe<br>T1 (Diff) = -Stan Lee<br>　　　　-Service Pack 2, +Service Pack1 | |
| 4 | T4 (Full) = Mary Jones, Stan Lee<br>　　　　　Service Pack 2<br>T3 (Diff) = -Mary Jones<br>T2 (Diff) = +John Doe<br>T1 (Diff) = -Stan Lee<br>　　　　-Service Pack 2, +Service Pack1 | |

FIG. 4

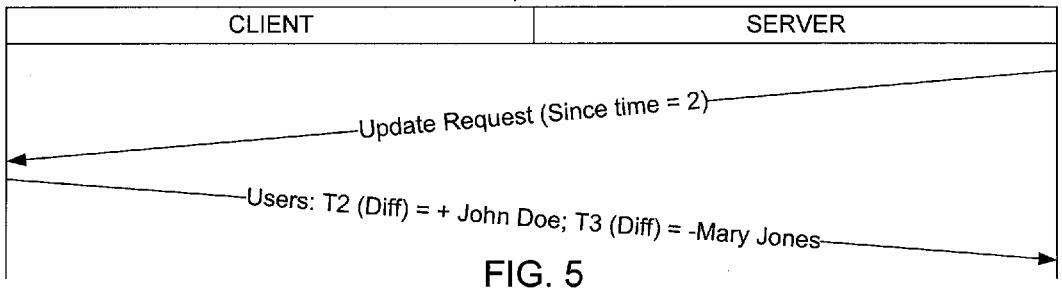

FIG. 5

After Update

| TIME | CLIENT | SERVER |
|---|---|---|
| 4 | T4 (Full) = Mary Jones, Stan Lee<br>　　　　　Service Pack 2<br>T3 (Diff) = -Mary Jones<br>T2 (Diff) = +John Doe<br>T1 (Diff) = -Stan Lee<br>　　　　-Service Pack 2, +Service Pack1 | T4 (Full) = Mary Jones, Stan Lee<br>　　　　　Service Pack 2<br>T3 (Diff) = -Mary Jones<br>T2 (Diff) = +John Doe<br>T1 (Diff) = -Stan Lee<br>　　　　-Service Pack 2, +Service Pack1 |

FIG. 6

METHODS AND APPARATUS FOR STORING AND TRANSMITTING HISTORICAL CONFIGURATION DATA ASSOCIATED WITH INFORMATION TECHNOLOGY ASSETS

CROSS REFERENCE TO RELATED APPLICATIONS

This application is a continuation application of, and claims the benefit of and priority to, U.S. patent application Ser. No. 11/945,947, filed on Nov. 27, 2007, the entire contents of which are hereby incorporated by reference.

TECHNICAL FIELD

The present application relates in general to managing information technology assets and more specifically to methods and apparatus storing and transmitting historical configuration data associated with information technology assets.

BACKGROUND

Information technology assets are commonly valuable and important assets which merit protection. Accordingly, information technology assets are often backed up to allow a system to be restored to a previous state, to avoid losing valuable information technology in the case of a system failure. It is often preferable for information technology assets to be restored as quickly as possible following a system failure. A challenge for management systems designed to protect information technology assets is that because many computing systems frequently change, and require frequent back ups, the methods for storing historical configuration data take up too much disk space or take to long to restore the system.

Management systems often back up information technology assets by regularly storing a complete version of a computing system, resulting in hundreds or thousands of complete versions stored, with most versions having only minor changes. However, this method often consumes an inordinately large amount of disk space. For example, a computing system may store five hundred complete versions of data so that the data may be quickly restored to any point in time for the last five hundred updates. Other management systems back up information technology assets by first storing one complete version of a computing system then regularly storing the changes made to the computing system. This method may cause the restore time to be rather long because many updates may have been performed since the initial version of the information technology assets were stored and each update must be applied to the initial version. Long restore times are often caused because the version desired is typically the most recent version or a relatively recent version. For example, the original complete version of a computing system may need to be updated with five hundred updates to get to the desired system state. The prior art methods of backing up and restoring computing systems are often becoming less efficient with computing systems often requiring more disk space and more frequent updates than systems of the past. The prior art fails to offer a management system that can back up and restore a computing system to a recent version without inefficiently using a large amount of disk space or inefficiently using a large amount of time to restore the system.

BRIEF DESCRIPTION OF THE FIGURES

FIG. 4 is a block diagram of two example data structures storing unsynchronized historical configuration data associated with an information technology asset.

FIG. 5 is an example message diagram showing a remote update.

FIG. 6 is a block diagram of two example data structures storing synchronized historical configuration data associated with an information technology asset.

DETAILED DESCRIPTION OF EXAMPLE EMBODIMENTS

Figure 1:
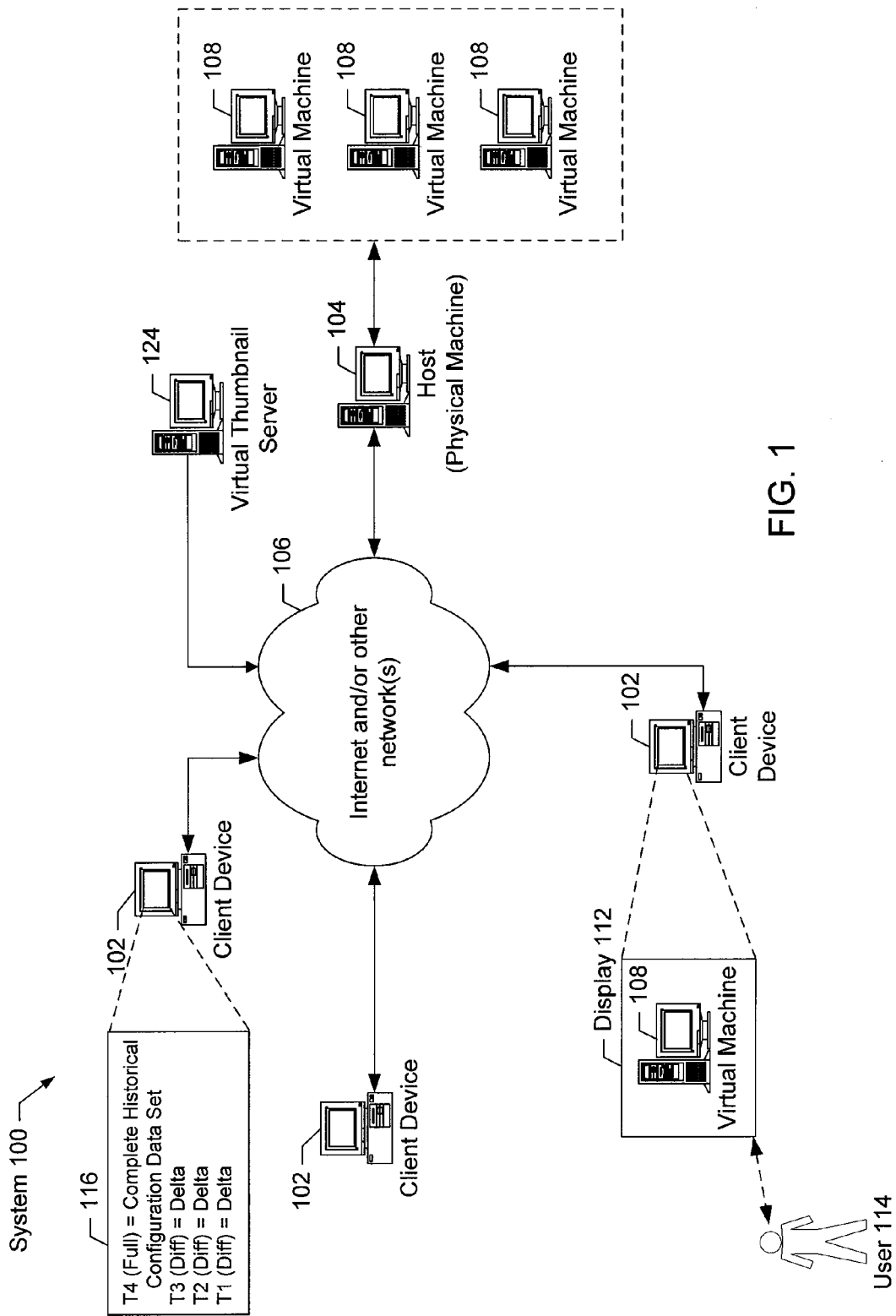
FIG. 1 is a high level block diagram of an example network communicating system.

The present system is most readily realized in a network communications system. A high level block diagram of an example network communications system 100 is illustrated in FIG. 1. The illustrated system 100 includes one or more client devices 102, one or more host physical machines 104, each host physical machine 104 hosting one or more virtual machines 108. The clients 102, and host physical machine 104 hosting virtual machines 108 may communicate with each other via a connection to one or more communications channels 106 such as the Internet or some other data network, including, but not limited to, any suitable wide area network or local area network. It will be appreciated that any of the devices described herein may be directly connected to each other instead of over a network.

One host physical machine 104 may interact with a large number of users 114 at a plurality of different client devices 102. Accordingly, each host physical machine 104 is typically a high end computer with a large storage capacity, one or more fast microprocessors, and one or more high speed network connections. Conversely, relative to a typical host physical machine 104, each client device 102 typically includes less storage capacity, a single microprocessor, and a single network connection. A client may also include in storage historical configuration data 116, which will be discussed in more detail below.

Each host physical machine 104 stores a plurality of files, programs, and/or web pages in one or more memories for use by the client devices 102. A single host physical machine 104 typically hosts a plurality of virtual machines 108. A virtual machine 108 appears to be a complete physical machine to end users. Each virtual machine 108 may be configured differently with its own operating system, applications, memory, virtual hardware, etc. A host physical machine 104 can have various container types for hosting the virtual machines 108 (e.g., VMware, Xen, Microsoft, etc.). The host physical machine 104 may have various options for managing the execution of the plurality of virtual machines 108.

Figure 2:
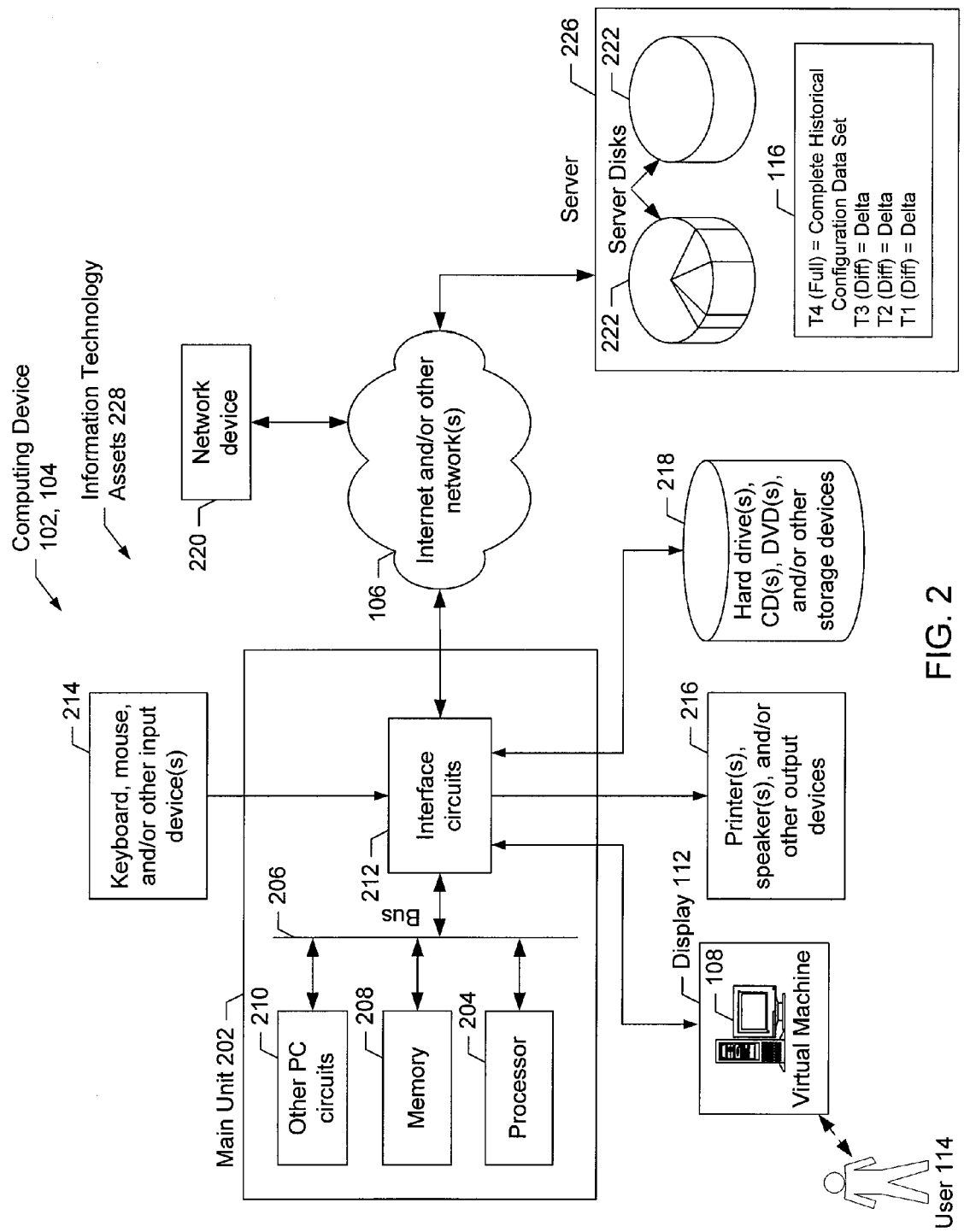
FIG. 2 is a detailed block diagram showing an example of a computing device.

A detailed block diagram of the electrical systems of an example computing device (e.g., a client device 102, and physical machine 104 hosting a virtual machine 108) is illustrated in FIG. 2. In this example, the computing device 102, 104 includes a main unit 202 which preferably includes one or more processors 204 electrically coupled by an address/data bus 206 to one or more memory devices 208, other computer circuitry 210, and one or more interface circuits 212. The processor 204 may be any suitable processor, such as a microprocessor from the INTEL PENTIUM® family of microprocessors. The memory 208 preferably includes volatile memory and non-volatile memory. Preferably, the memory 208 stores a software program that interacts with the other devices in the system 100 as described below. This program may be executed by the processor 204 in any suitable manner. The memory 208 may also store digital data indicative of documents, files, programs, web pages, etc. retrieved from a computing device 102, 104 and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, and/or a voice recognition system.

One or more displays 112, printers, speakers, and/or other output devices 216 may also be connected to the main unit 202 via the interface circuit 212. The display 112 may be a cathode ray tube (CRTs), liquid crystal displays (LCDs), or any other type of display. The display 112 generates visual displays of data generated during operation of the computing device 102, 104. For example, the display 112 may be used to display web pages received from a computing device 102, 104. The visual displays may include prompts for human input, run time statistics, calculated values, data, etc.

One or more storage devices 218 may also be connected to the main unit 202 via the interface circuit 212. For example, a hard drive, CD drive, DVD drive, and/or other storage devices may be connected to the main unit 202. The storage devices 218 may store any type of data, such as a plurality of virtual machines 108, or historical configuration data 116 for backing up information technology assets 228, which may be used by the computing device 102, 104.

The computing device 102, 104 may also exchange data with other network devices 220 via a connection to the network 106. Network devices 220 such as servers 226 may be used to store historical configuration data 116 and store and operate various applications relating to efficiently receiving, transmitting, processing, and storing the historical configuration data 116. It would be understood by persons having skill in the art that historical configuration data 116 may be stored in a client device 102, for example in memory 208 or storage device 218. The network connection may be any type of network connection, such as an Ethernet connection, digital subscriber line (DSL), telephone line, coaxial cable, etc. Access to a computing device 102, 104 can be controlled by appropriate security software or security measures. An individual users' access can be defined by the computing device 102, 104 and limited to certain data and/or actions. Accordingly, users of the system 100 may be required to register with one or more computing devices 102, 104.

As noted previously, a computing device 102, 104 may have various options for managing information technology assets 228, the information technology assets 228 comprising information relating to the computing device 102, 104, typically located within the computing device 102, 104. A management system is a system of managing information technology assets 228, typically including historical configuration data 116 for accomplishing various tasks such as facilitating the protection of the information technology assets 228. A management system may be implemented in a client 102, a host physical machine 104, and associated virtual machines 108. A common implementation for a management system is to store, or back up, historical configuration data 116 locally and/or remotely. A management system may remotely store historical configuration data 116 using any suitable method of data transmission, such as via the internet and/or other networks 106.

Figure 3:
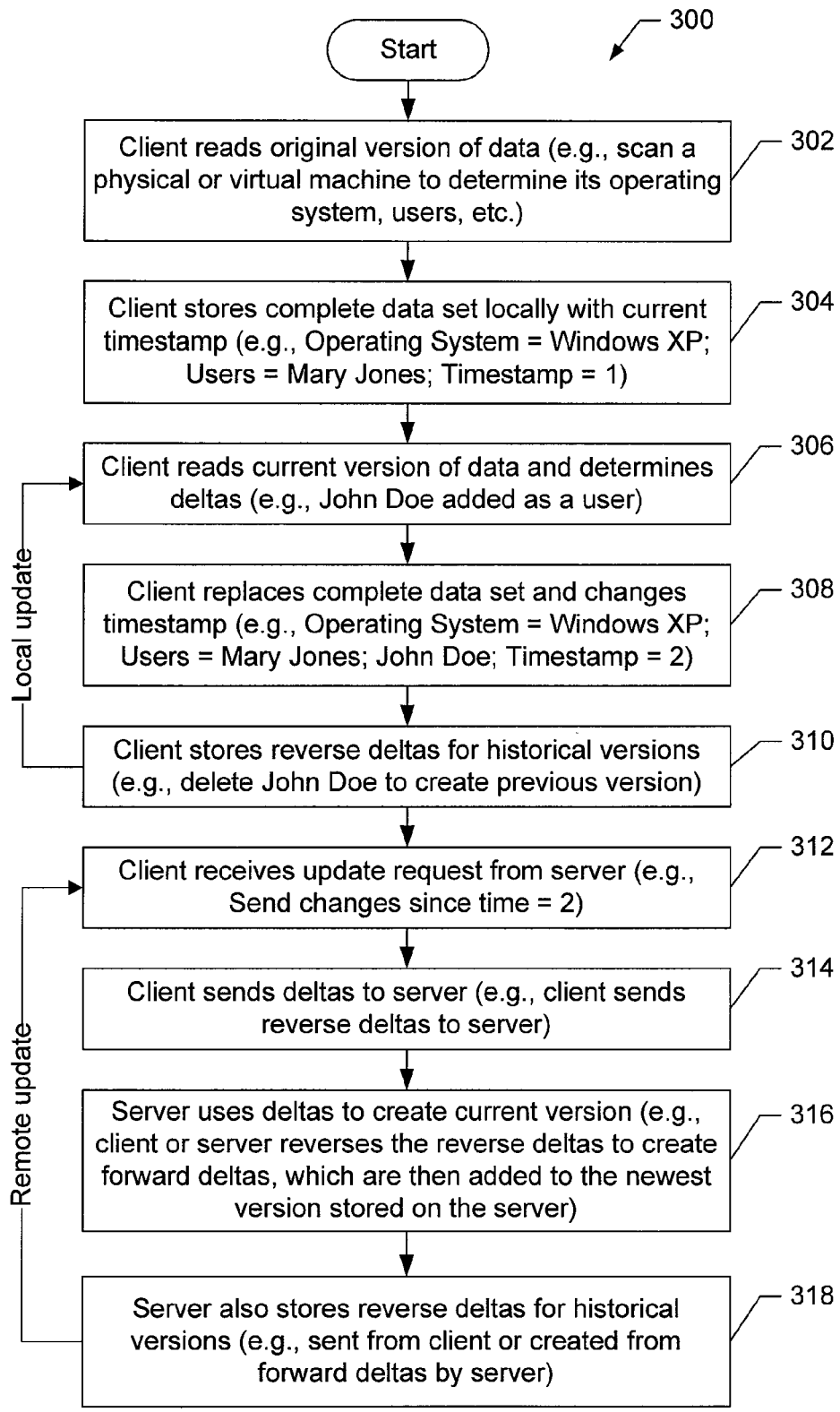
FIG. 3 is a flowchart of an example process for storing and transmitting historical configuration data associated with information technology assets.

FIG. 3 is a flowchart of an example process 300 for storing and transmitting historical configuration data 116 associated with information technology assets 228. Although the process 300 is described with reference to the flowchart illustrated in FIG. 3, it will be appreciated that many other methods of performing the acts associated with the process 300 may be used. For example, the order of many of the blocks may be changed, and many of the blocks described are optional.

The example process 300 begins when the client 102 reads an original version of historical configuration data 116 (block 302). For example, a client 102 scans a physical machine 104 or virtual machine 108 at a first point in time to determine historical configuration data 116 such as the operating system, users, etc. for the scanned physical machine 104 or virtual machine 108. Then, the client 102 stores the complete historical configuration data 116 set locally with a current timestamp (block 304). The client 102 may store all the historical configuration data 116 scanned locally on the client 102 at the first point in time, including data such as: Operating System=Windows XP; Users=Mary Jones; Timestamp=1. It should be appreciated that the client 102 may store the scanned historical configuration data 116 non-locally, for example on a remote server 226.

After the client 102 has stored a complete set of historical configuration data 116, the client 102 reads the current version of data and determines deltas (block 306). Deltas are decremental differences between two versions of data. For example, at a second point in time, the client 102 may read that John Doe has been added as a user. Then the client 102 replaces the complete historical configuration data 116 set and changes the timestamp (block 308). For example, the client 102 may store the scanned historical configuration data 116 locally on the client 102, including updated historical configuration data 116 such as: Operating System=Windows XP; Users=Mary Jones; John Doe; Timestamp=2. Once the updated complete historical configuration data 116 set with a new timestamp replaces an earlier historical configuration data 116 set, the client stores reverse deltas for historical versions (block 310). For the above example, the delta stored may be delete User=John Doe to create a previous version of historical configuration data 116.

The client 102 may perform a local update by reading the current version of historical configuration data 116 and determining deltas (block 306), then replacing the complete historical configuration data 116 set and changing the timestamp (block 308), and then storing reverse deltas for historical versions of the historical configuration data 116 (block 310). The local update may be performed at regular intervals to help ensure that the historical configuration data 116 associated with information technology assets 228 is properly documented and stored to enable a relatively quick and easy restore of the information technology assets 228. It should be appreciated that the client 102 may also perform a remote update via the internet and/or other networks 106.

Once a client 102 has performed a local update, the client 102 may receive an update request from a server 226 (block 312). For example, the client 102 receives a request from a remote server 226 to send changes to the historical configuration data 116 set since time=2. After receiving a request from a server 226, the client 102 sends deltas to the server 226 (block 314). It should be appreciated that if a server 226 requests an update for a physical machine 104 or virtual machine 108, but the requesting server 226 does not have a complete historical configuration data 116 set for the physical machine 104 or virtual machine 108, the client 102 may send the server 226 the current version of the complete set of historical configuration data 116 as well as the deltas.

After a client 102 has sent deltas to a server 226 requesting an update, the server 226 uses the deltas to create a current version of historical configuration data 116 (block 316). For example, either the client 102 or server 226 reverses the reverse deltas to create forward deltas, which are then added to the newest version of historical configuration data 116 stored on the server 226 to create a current version of the complete set of historical configuration data 116. Then the server 226 also stores reverse deltas for historical versions of the historical configuration data 116 (block 318). For example, if the client 102 sent reverse deltas, the reverse deltas would be stored for historical versions of the historical configuration data 116, but if the client 102 sent forward deltas, the server 226 would reverse the forward deltas to store previous versions of historical configuration data 116.

FIG. 4 is a block diagram of two example data structures storing unsynchronized historical configuration data 116 associated with an information technology asset 228. The example data structures, client 102 and server 226, provide a representation of the historical configuration data 116 at four times, T1, T2, T3, and T4. In this example, the only data analyzed is the user data and service pack data of the client 102. At a first time T1, the only user is John Doe, and the service pack installed is Service Pack 1. At time T1 a first scan of the historical configuration data 116 is performed, so the historical configuration data 116 set stored is "T1 (Full)=John Doe, Service Pack 1". The historical configuration data 116 set indicates the time the data set was determined with timestamp "T1" and that it is the full version of historical configuration data 116 with "(Full)". The historical configuration data 116 set indicates the user is John Doe and the service pack is Service Pack 1.

At a second time T2, the client 102 historical configuration data 116 is different than the historical configuration data 116 from time T1. At time T2 a second scan of the historical configuration data 116 is performed, such that the data set stored is "T2 (Full)=John Doe, Stan Lee, Service Pack 2; T1 (Diff)=−Stan Lee, −Service Pack 2, +Service Pack 1". The historical configuration data 116 set indicates the time the full version of the data set was determined at time=2, with timestamp and version "T2 (Full)". The historical configuration data 116 set indicates the users are John Doe and Stan Lee, and the service pack is Service Pack 2. The historical configuration data 116 set also indicates the previous version of the data set was determined at time=1, with timestamp and version "T1 (Diff)". To restore the computing system 102, 104 to a prior state, the users and service pack are changed. "T1 (Diff)=−Stan Lee, −Service Pack 2, +Service Pack 1" is interpreted to take Stan Lee off of the user list, uninstall Service Pack 2, and install Service Pack 1, in order to restore the historical configuration data 116 to its state at time=1. The minus or plus signs in the historical configuration data 116 set indicates whether the associated data should be added or taken away to restore the computing system 102, 104 to its prior state. The minus and plus signs illustrated are opposite of the change made on the computing system 102, 104 between the first time and the second time when the computing system 102, 104 was scanned for historical configuration data 116.

At a third time T3, the client 102 historical configuration data 116 set stored is "T3 (Full)=Stan Lee, Service Pack 2; T2 (Diff)=+John Doe; T1 (Diff)=−Stan Lee, −Service Pack 2, +Service Pack 1". The historical configuration data 116 set indicates the user is Stan Lee and the service pack is Service Pack 2. The historical configuration data 116 set also indicates the previous version of the data set was determined at time=2, with timestamp and version "T2 (Diff)". To restore the computing system 102, 104 to its prior state, the user list is changed. "T2 (Diff)=+John Doe" is interpreted to add John Doe to the user list in order to restore the historical configuration data 116 to its state at time=2. To restore the computing system 102, 104 to T1, in addition to adding John Doe to the user list, Stan Lee is taken off of the user list, Service Pack 2 is uninstalled, and Service Pack 1 is installed.

At a fourth time T4, Mary Jones is added as a user to the client 102, so the client 102 historical configuration data 116 set stored is "T4 (Full)=Mary Jones, Stan Lee, Service Pack 2; T3 (Diff)=−Mary Jones; T2 (Diff)=+John Doe; T1 (Diff)=−Stan Lee, −Service Pack 2, +Service Pack 1". The historical configuration data 116 set indicates the users are Stan Lee and Mary Jones, and the service pack is Service Pack 2. The historical configuration data 116 set also indicates the previous version of the data set was determined at time=3, with timestamp and version "T3 (Diff)". To restore the computing system 102, 104 to its prior state, the user list is changed. "T3 (Diff)=−Mary Jones" is interpreted to take Mary Jones off of the user list in order to restore the historical configuration data 116 to its state at time=3. To restore the computing system 102, 104 to T2, John Doe is added to the user list and Mary Jones is taken off the user list. To restore the computing system 102, 104 to T1, Mary Jones is taken off the user list, which brings the system to T3, and John Doe is added to the user list which brings the system to T2, and Stan Lee is taken off of the user list, Service Pack 2 is uninstalled, and Service Pack 1 is installed, in order to bring the system back to its state at time=1.

In the example illustrated in FIG. 4, server 226 has preformed a remote update for a complete version of historical configuration data 116 for time=2. However, the server 226 and client 102 are unsynchronized data structures. The server 226 is not synchronized to update historical configuration data 116 when the client 102 updates historical configuration data 116. For example, at time=4, if the client 102 historical configuration data 116 were corrupted, the server 226 could not restore the client 102 to the client's 102 state at time=4 or time=3, because the last update version the server 226 contains is at time=2. Accordingly, a server 226 may be updated to help protect information technology assets 228 otherwise located on the client 102.

FIG. 5 is an example message diagram showing a remote update. The server 226 may send the client 102 an update request. The update request may request historical configuration data 116 which has only been created after the most recent time that the server 226 was updated, for example, at time=2. The client 102 may send the server 226 historical configuration data 116 that the client 102 would use to restore to a prior computing system 102, 104 state. For example, the client 102 may send the server 226 the reverse deltas "T2 (Diff)=+John Doe; T3 (Diff)=−Mary Jones". Each delta is transmitted with the associated timestamp so the delta information can be used to create any historical configuration data 116 state. In this example, the server 226 would take John Doe off of the user list from T2, and add Mary Jones to the user list from T2, in order to reach the current stored version of historical configuration data 116 with Mary Jones and Stan Lee as users and Service Pack 2 installed. Further, the server 226 may store the reverse deltas T2 (Diff)=+John Doe; T3 (Diff)=−Mary Jones" so the server 226 can restore the computing system 102, 104 to any of time T3, T2, and T1. Once the server 226 receives the update to the most recent version of historical configuration data 116, the client 102 and server 226 have synchronized historical configuration data 116. It should be appreciated that various other processes may be employed to perform a remote update. For example, the client 102 could convert reverse deltas to forward deltas to send to the server 226 or the client 102 could send the server 226 regularly schedules updates rather than transmit the historical configuration data 116 in response to a request.

FIG. 6 is a block diagram of two example data structures storing synchronized historical configuration data 116 associated with an information technology asset 228. The example server 226 is illustrated following an update of the client's 102 historical configuration data 116, so both the client 102 and the server 226 have the same historical configuration data 116. The synchronized historical configuration data 116 may help to protect information technology assets 228 located on the client 102. If the client 102 loses the historical configuration data 116, the server 226 may send the client 102 the latest version of the historical configuration data 116 without performing time consuming computations. It should be appreciated that the example client 102 and server 226 illustrated in FIGS. 4, 5, and 6 only have scanned the client 102 four times for historical configuration data 116, which is a small number of back up scans. As additional scans are performed, the example process becomes increasingly time efficient for late version restores of the historical configuration data 116. For example, if five hundred scans were performed, such that the historical configuration data 116 set included "T500 (Full)=(users, service pack, operating system, etc.)", the client 102 could restore all historical configuration data 116 for time=500 very quickly. The management system would not be burdened with storing five hundred full versions of the complete historical configuration data 116 set to allow for the quick restore, and the management system does not have to compute any version changes. In a further example, the client 102 could restore the historical configuration data 116 for time=497 very quickly, because only three version changes would be computed by the computing device 102, 104.

In summary, persons of ordinary skill in the art will readily appreciate that methods and apparatus for storing and transmitting historical configuration data associated with information technology assets have been described. The foregoing description has been presented for the purpose of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

The invention claimed is:

1. A computer implemented method for storing historical configuration data associated with an information technology asset, the method comprising:
    reading a first configuration data set from a machine at a first time;
    storing the first configuration data, wherein a first timestamp is stored with the first configuration data set;
    reading a second configuration data set at a second time;
    replacing the first configuration data set with the second configuration data set, wherein a second timestamp is stored with the second configuration data set, the second timestamp being chronologically after the first timestamp;
    reading a third configuration data set at a third time;
    replacing the second configuration data set with the third configuration data set, wherein a third timestamp is stored with the third configuration data set, the third timestamp being chronologically after the second timestamp; and
    persistently storing a first reverse delta between the first configuration data set and the second configuration data set and a second reverse delta between the second configuration data set and the third configuration data set after the third configuration data set replaced the first configuration data set to allow for a restore of any one of the first configuration data set and the second configuration data set.

2. The method of claim 1, further comprising:
    reading a fourth configuration data set at a fourth time;
    replacing the third configuration data set with the fourth configuration data set, wherein a fourth timestamp is stored with the fourth configuration data set, the fourth timestamp being chronologically after the third timestamp; and
    persistently storing a third reverse delta between the third configuration data set and the fourth configuration data set to allow for a restore of any one of the first configuration data set, the second configuration data set, and the third configuration data set.

3. The method of claim 1, wherein the information technology asset is a physical machine.

4. The method of claim 1, wherein the information technology asset is a virtual machine.

5. An apparatus for storing historical configuration data associated with an information technology asset, the apparatus comprising:
    a processor; and
    a storage device, the storage device storing a software program structured to cause the processor to:
        read a first configuration data set from a machine at a first time;
        store the first configuration data, wherein a first timestamp is stored with the first configuration data set;
        read a second configuration data set at a second time;
        replace the first configuration data set with the second configuration data set, wherein a second timestamp is stored with the second configuration data set, the second timestamp being chronologically after the first timestamp;
        read a third configuration data set at a third time;
        replace the second configuration data set with the third configuration data set, wherein a third timestamp is stored with the third configuration data set, the third timestamp being chronologically after the second timestamp; and
        persistently store a first reverse delta between the first configuration data set and the second configuration data set and a second reverse delta between the second configuration data set and the third configuration data set after the third configuration data set replaced the first configuration data set to allow for a restore of any one of the first configuration data set and the second configuration data set.

6. The apparatus of claim 5, wherein the software program is structured to cause the processor to:
    read a fourth configuration data set at a fourth time;
    replace the third configuration data set with the fourth configuration data set, wherein a fourth timestamp is stored with the fourth configuration data set, the fourth timestamp being chronologically after the third timestamp; and
    persistently store a third reverse delta between the third configuration data set and the fourth configuration data set to allow for a restore of any one of the first configuration data set, the second configuration data set, and the third configuration data set.

7. The apparatus of claim 5, wherein the information technology asset is a physical machine.

8. The apparatus of claim 5, wherein the information technology asset is a virtual machine.

9. A non-transitory machine readable media storing instructions structured to cause an apparatus for storing historical configuration data associated with an information technology asset to:
    read a first configuration data set from a machine at a first time;
    store the first configuration data, wherein a first timestamp is stored with the first configuration data set;
    read a second configuration data set at a second time;
    replace the first configuration data set with the second configuration data set, wherein a second timestamp is stored with the second configuration data set, the second timestamp being chronologically after the first timestamp;
    read a third configuration data set at a third time;
    replace the second configuration data set with the third configuration data set, wherein a third timestamp is stored with the third configuration data set, the third timestamp being chronologically after the second timestamp; and
    persistently store a first reverse delta between the first configuration data set and the second configuration data set and a second reverse delta between the second configuration data set and the third configuration data set after the third configuration data set replaced the first configuration data set to allow for a restore of any one of the first configuration data set and the second configuration data set.

10. The machine readable media of claim 9, wherein the instructions are structured to cause the apparatus to:
    read a fourth configuration data set at a fourth time;
    replace the third configuration data set with the fourth configuration data set, wherein a fourth timestamp is stored with the fourth configuration data set, the fourth timestamp being chronologically after the third timestamp; and
    persistently store a third reverse delta between the third configuration data set and the fourth configuration data set to allow for a restore of any one of the first configuration data set, the second configuration data set, and the third configuration data set.

11. The machine readable media of claim 9, wherein the information technology asset is a physical machine.

12. The machine readable media of claim 9, wherein the information technology asset is a virtual machine.

* * * * *